Feb. 6, 1951  W. HRYBINYK  2,540,332
SAFETY CHUCK FOR MACHINE TOOLS
Filed Feb. 15, 1947  2 Sheets-Sheet 1

Inventor
Walter Hrybinyk
By Wooster & Davis Attorneys

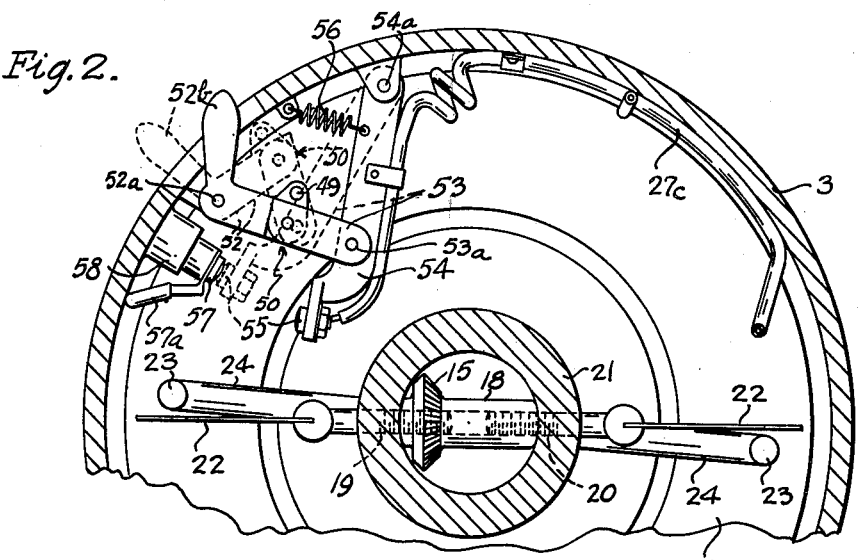
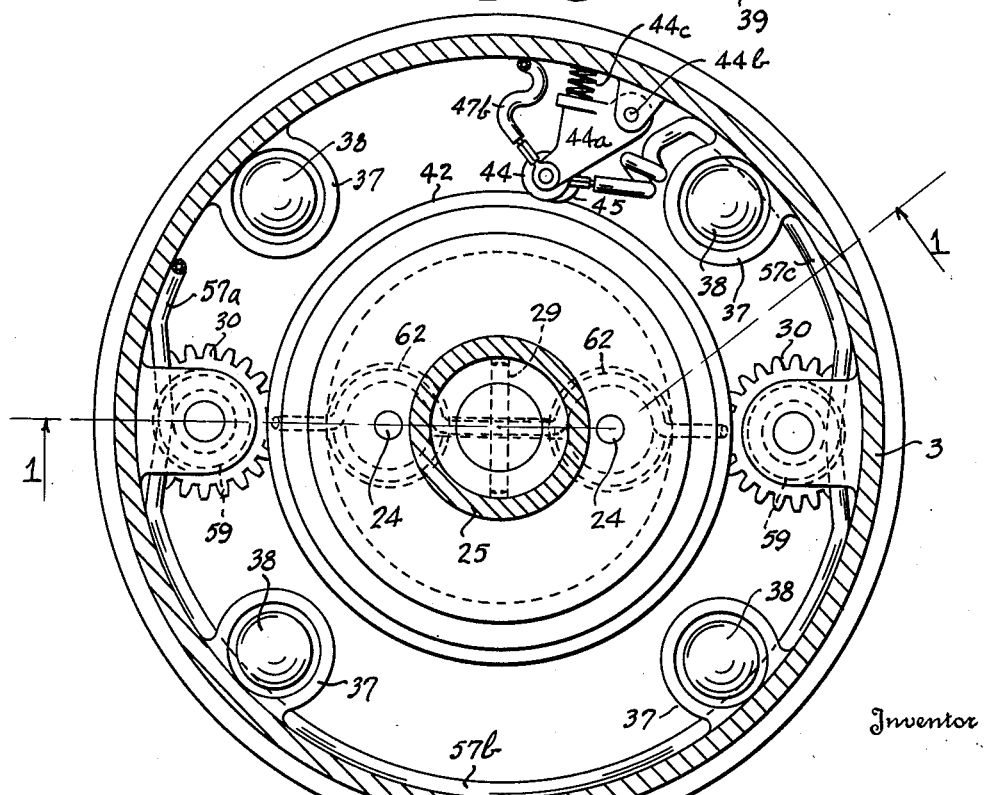

Patented Feb. 6, 1951

2,540,332

UNITED STATES PATENT OFFICE 2,540,332

SAFETY CHUCK FOR MACHINE TOOLS

Walter Hrybinyk, Ansonia, Conn.

Application February 15, 1947, Serial No. 728,824

8 Claims. (Cl. 192—150)

This invention relates to a coupling mechanism and more particularly to a safety chuck for machine tools.

When using a machine tool for drilling, reaming, tapping or the like the drill, for example, may bind in the drill opening or hit a hard spot or be otherwise impeded, thereby tending to stop the drill. If the resistance is great enough the force driving the machine may be sufficient to break the drill or the motor shaft coupled thereto. It is thus desirable that the driving force be disconnected from the driven tool so that although the machine may keep on operating, the tool and its support may stop without breaking anything. Furthermore, as small drills or the like are more apt to be broken than large ones, it is further desirable that the amount of force required to make the disconnection be variable.

It is, therefore, an object of the present invention to provide a safety chuck which will disconnect the driving force from the driven tool when the driving force becomes too great, or the resistance to operation of the tool exceeds a certain limit.

It is another object to provide a safety chuck which will disconnect the driving force from the driven tool when the driving force exceeds a predetermined limit and where the driving force required to make the disconnection may be varied.

The above and other objects of the invention will become more apparent by reference to the following detailed description and the accompanying drawing wherein:

Fig. 2 is a transverse sectional view taken substantially through line 2—2 of Fig. 1; and Fig. 3 is a transverse sectional view taken substantially through line 3—3 of Fig. 1.

Figure 1:
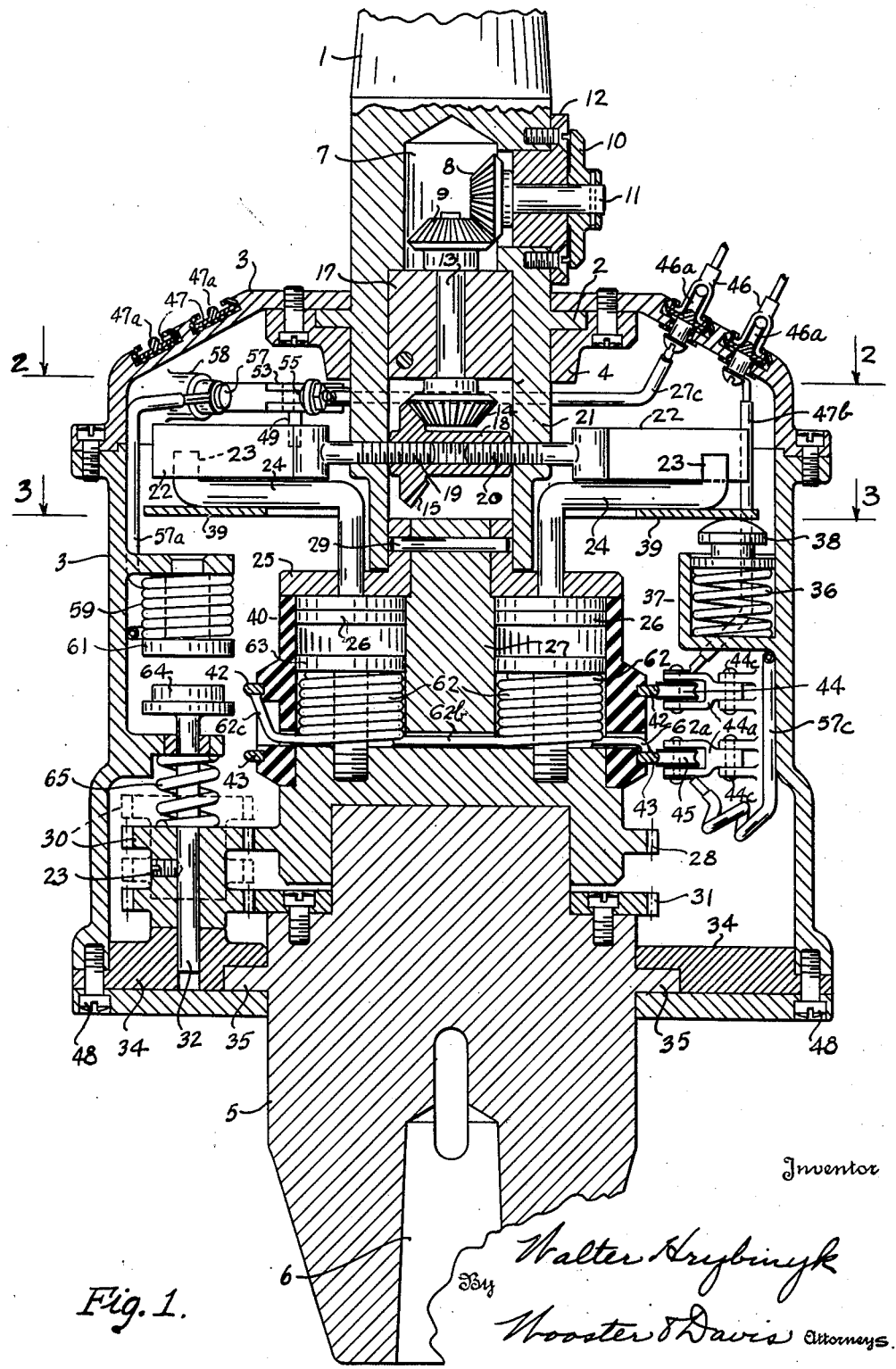
Fig. 1 is a vertical sectional view on an enlarged scale of one embodiment of the invention taken substantially through a line 1—1 of Fig. 3.

In the drawing, stud 1 has a projecting shoulder or flange 2 which is adapted to carry casing 3 held to shoulder 2 by means of collar 4. Although casing 3 is held against shoulder 2 by means of collar 4, the tolerances are such that stud 1 is free to turn relative to casing 3. Stud 1 is adapted to be clamped or otherwise suitably fastened to a tool holder or chuck of the machine tool where the usual drill or other tool is fastened, so as to be driven by the drive mechanism of the machine tool. At the other end of casing 3 is a tool holding block 5 which has a socket 6 to receive the shank of the drill or other tool. A cavity 7 is formed in stud 1 and mounted therein is an adjustment comprising bevelled gears 8 and 9 which may be adjusted from the outside by means of a positionable knob dial 10. Knob dial 10 is secured to shaft 11 which is held in place by bearing 12. Shaft 11 is also connected to bevelled gear 8 which meshes with gear 9 which operates through shaft 13 to operate bevelled gear 14 which meshes with bevelled gear 15, both of which are mounted in a second cavity 16. Shaft 13 is held in place by bearing 17 which is pinned to stud 1. Shank 18 of bevelled gear 15 is drilled and threaded to accommodate right and left hand screws 19 and 20 which are inserted through wall 21 so as to rotate with stud 1. Secured in each of these screws is a flat driving spring 22 which engages the upper ends 23 of angle driving rods 24.

By adjusting positionable dial knob 10, screws 19 and 20 can be moved in or out with respect to wall 21, thus determining the point on flat driving springs 22 at which the springs will engage the upper ends 23 of angle driving rods 24, thereby allowing an adjustment of the tension at which the device will yield.

Angle driving rods 24 project through holes drilled in collar 25 and connect to armature 26. Collar 25 is free to rotate relative to stud 1 and is driven by angle driving rods 24. Collar 25 is pinned to shank 27 of driving gear 28 by means of pin 29. Driving gear 28 is adapted to mesh with spur gears 30 which in turn are adapted to mesh with ring gear 31 mounted on the block 5 to thereby drive tool holding block 5. Spur gears 30 are held in place on respective shafts 32 by means of set screws 33, the lower end of shafts 32 being held by clamp 34 which holds tool holding block 5 to casing 3 by means of shoulder 35 of tool holding block 5.

Springs 36 held by spring holders 37 which form an integral part of casing 3 carry supports 38 which hold supporting ring 39 against angle driving rods 24, thereby normally allowing the upper ends 23 of angle driving rods 24 to contact flat driving springs 22. Sleeve 40 which may be made of any suitable insulating material is carried by the lower portion of driving gear 28 and is connected to collar 25. Insulating sleeve 40 is slotted to carry slip rings 42 and 43 which are connected by means of contact rollers 44 and 45 to power input terminals 46, mounted on some stationary part of the machine tool (not shown). Rollers 44 and 45 may be mounted on levers 44a pivoted to the casing at 44b with springs 44c to maintain the rollers in contact with the rings 42 and 43. It is readily apparent, however, that rollers 44 and 45 need not be constructed as shown but rather may consist of carbon brushes or any other standard electrical contacting means. These power input terminals fit into grooved electrically conducting tracks or rings 47 which are inset into casing 3 and insulated therefrom. The terminals each carry a contact roller 46a running on the ribs 47a of members 47. These tracks allow casing 3 to rotate relative to the power input terminals 46 and yet supply electrical energy to contact rollers 44 and 45. One of the rings 47 is connected by a conductor 47b to contact 44, while the other ring 27 is connected by conductor 27c to the movable contact 55 presently to be described.

The operation of the device is as follows: The drive mechanism of the machine tool rotates stud 1, which causes flat driving springs 22 to likewise rotate. Flat driving springs 22 engage the upper ends 23 of angle driving rods 24, thereby causing collar 25 to likewise rotate. However, as collar 25 is pinned to shank 27 of driving gear 28, the driving gear likewise rotates. As driving gear 28 meshes with spur gears 30 which in turn mesh with ring gear 31 carried by tool holding block 5, the tool holding block also rotates. It is further apparent that as shafts 32 are held by clamp 34, which is attached to casing 3 by means of machine screws 48, casing 3 will likewise rotate.

Should now the drill or other tool carried by tool holding block 5 become jammed or should the driving force become so great as to be apt to break it or the driving mechanism, springs 22 will yield and will fly by the upper ends 23 of angle driving rods 24. These driving springs will then hit lug 49 breaking the toggle 50 comprising the levers 52 and 53 which are pivoted together at lug 49 and to the casing 3 and lever 54 at 52a and 53a respectively. As the toggle is broken, as shown in dotted lines, lever 54 pivoted to casing 3 at 54a and which carries electrical contact 55 is free to move and is drawn by spring 56 against contact 57, as shown in dotted lines Fig. 2. Contact 57 is carried by mounting post 58 which is connected to casing 3 and insulated therefrom, and is electrically connected with solenoid coils 59 by conductor 57a, the coils being connected by conductor 57b and the outlet from the second coil being connected to roller contact 45 by conductor 57c. Casing 3 is slotted to allow reset lever handle 52b connected to the toggle to extend through the casing.

As the toggle is broken and as contacts 55 and 57 are engaged, an electrical circuit is thereby closed, the circuit being through winding 59 of magnets 61 through roller contact 45 and slip ring 43, through windings 62 of magnets 63, through slip ring 42, and roller contact 44 to input terminals 46. This is because one magnet coil 62 is connected to ring 43 by conductor 62a, the two coils 62 are connected by conductor 62b and the second coil is connected to conductor ring 42 by conductor 62c. This completed circuit causes magnets 61 and magnets 63 to be energized simultaneously. The energizing of magnets 61 will attract armatures 64 which are connected to shafts 32 on which are mounted spur gears 30. As magnets 61 draw the shafts upward spur gears 30 come out of mesh with driving gear 28 and ring gear 31, as indicated in dotted lines Fig. 1, and thus there is no driving force connecting driving gear 28 with tool holding block 5 and thus this block may stop. The energizing of magnets 63 attract armatures 26, which being connected to angle driving rods 24 cause said angle driving rods to be drawn downwardly so that the upper ends 23 are brought below the driving springs 22. Under these conditions stud 1 is free to rotate relative to casing 3, while tool holding block 5 may be stopped as there is no direct driving connection between stud 1 and tool holding block 5. Furthermore, flat driving springs 22 may revolve without repeatedly striking the upper ends 23 of angle rods 24. As there is no direct driving connection between stud 1 and tool holding block 5, there is thus no danger of breaking the tool or any of the driving mechanism or doing any other damage.

The cause of the excessive load may then be removed or the power may be turned off. After the trouble has been cleared reset handle 52b on lever 52 may be pushed inwards, causing the toggle 50 to take its original position and thereby disengage contacts 55 and 57 and open the electrical circuit through the magnets. As soon as the circuit is opened the magnets are de-energized and springs 65 associated with shafts 32 drive spur gears 30 downwards into mesh with driving gear 28 and ring gear 31. Springs 36 resume their normal position and drive supports 38 and supporting ring 39 upwards, thereby allowing the upper ends 23 of angle rods 24 to again engage with flat springs 22.

From the foregoing description it is apparent that by turning knob dial 10 the flat driving springs can be moved inwardly or outwardly relative to wall 21. If the knob dial is turned so that the screws are drawn inward, then the angle driving rods will contact the flat springs near their outer ends and the driving force required to make the springs yield and fly by the angle rods will be a minimum. On the other hand, when the knob dial is turned so that the springs engage the angle driving rods at a point nearest the ends of the screws, the effective spring resistance will be greater and a greater driving force will be required to make the springs yield.

While there has been here described one embodiment of the present invention, it will be manifest to one skilled in the art that various changes and modifications may be made therein without departing from the invention. It is therefore aimed in the appended claims to cover all such changes and modifications as fall within the scope of the invention.

Having thus set forth the nature of my invention, what I claim is:

1. A tool holding chuck including a rotatable driving member comprising a stud having a cavity formed therein, a casing carried by said stud, left and right hand threaded screws projecting into said cavity through the wall of said stud substantially perpendicular thereto and rotatable therewith, a bevelled gear mounted in said cavity and having its shank drilled and tapped to accommodate said screws, flat driving springs secured to the ends of the screws exterior to the walls of said stud, a second bevelled gear meshing with said first bevelled gear, a connection from said second bevelled gear to a point outside of said stud and said casing to allow rotation of said first bevelled gear and a resulting horizontal movement of said driving springs, a collar having its longitudinal axis coincident with the longitudinal axis of said stud and which is capable of rotating relative to said stud, a driven rod connected to said collar, one end of said rod being adapted to engage said flat driving springs and be driven thereby, an electromagnet, the other end of the rod connected to the armature of said electro-magnet, a driving gear having its shank connected to said collar and rotatable therewith, a driven member comprising a block having a ring gear carried thereby, a spur gear adapted to mesh with said driving gear and said ring gear, a gear disengaging electro-magnet associated with said spur gear, an electrical circuit connecting the windings of said electro-magnets to a source of electrical energy outside of said casing, and a switch in said circuit, said switch being carried by said casing and adapted to be operated by said flat driving springs when the load on said block becomes so great that the driving springs yield and fly past said driven rod, the operation of said toggle switch causing the electro-magnets to operate and disengage said driving gear and said ring gear, and to disengage the driving springs and the driven rod.

2. A tool holding chuck including a driving member comprising a stud, a casing carried by said stud, positionable members carried by said stud and rotatable therewith, driving springs connected to said positionable members, a driving gear, driven rods connected to said driving gear, the upper ends of said driven rods being adapted to engage said driving springs and be driven thereby, the other ends being connected respectively to the armatures of rod disengaging electro-magnets, a driven block having a ring gear carried thereby, a spur gear adapted to mesh with said driving gear and said ring gear, a gear disengaging electro-magnet associated with said spur gear, an electrical circuit connecting the windings of said electro-magnets to a source of electrical energy outside of said casing, and a switch in said circuit adapted to be operated by said flat driving springs when the load on said driven block becomes so great that the driving springs yield and fly past said driven rods, the operation of said switch causing the gear disengaging electro-magnet to operate and displace said spur gear so as to disengage said driving gear and said ring gear, and to operate said rod disengaging electro-magnets so as to disengage the driving springs and the driven rods.

3. A tool holding chuck including a rotatable driving member comprising a stud, a casing carried by said stud, an adjustable tension driving spring carried by said stud and adapted to rotate therewith, a driven rod member adapted to normally engage said driving spring and be driven thereby, a driving gear connected to said driven rod member and capable of being driven thereby, an electro-magnet associated with said driven rod member adapted to be energized and thereby disengage said driven rod member and said driving spring, a driven block having a ring gear carried thereby, a spur gear normally engaging said driving gear and said ring gear, a gear disengaging electro-magnet associated with said spur gear and adapted to be energized and thereby disengage said ring gear and said driving gear, an electrical circuit connecting the windings of said electro-magnets to a source of electrical energy exterior to said casing, and a switch in said circuit adapted to be operated by said driving spring when the driving load on said driving spring exceeds a predeterminable limit determined by the tension adjustment of said adjustable tension driving spring, the operation of said switch causing said electro-magnets to be energized.

4. A tool holding chuck including a rotatable driving member comprising a stud, a casing carried by said stud, an adjustable tension driving spring carried by said stud and adapted to rotate therewith, a driven rod member adapted to normally engage said driving spring and be driven thereby, a driving block connected to said driving rod member and capable of being driven thereby, an electro-magnet associated with said driven rod member adapted to be energized and thereby disengage said driven rod member and said driving spring, a driven block, connecting means engaging said driving block and said driven block, an electro-magnet associated with said connecting means and adapted to be energized and thereby disengage said driving block and said driven block, an electrical circuit connecting the windings of said electro-magnets to a source of electrical energy exterior to said casing, and a switch in said circuit adapted to be operated by said driving spring when the driving load on said driving spring exceeds a predeterminable limit determined by the tension adjustment of said adjustable tension driving spring, the operation of said switch causing said electro-magnets to be energized.

5. A tool holding chuck including a rotatable driving member comprising a stud, a casing carried by said stud, adjustable tension driving spring means connected to said stud and adapted to yield if the load on said driving spring means exceeds predeterminable limits determined by the tension adjustment of said driving spring means, driven means adapted to rotate relative to said stud, said driven means being connected to said driving spring means and being driven thereby, electro-magnetic means adapted to disengage said driving spring means and said driven means, means for operating said electro-magnetic means when the load on the driving spring means exceeds a predeterminable limit, a driven block, connecting means driven by said driving means and in turn driving said driven block, electro-magnetic means associated with said connecting means and being adapted to disengage said driving means and said driven block, and means for operating said last mentioned electro-magnetic means when the load on said driving spring means exceeds a predeterminable limit.

6. A tool holding chuck including a rotatable driving member comprising a stud, a casing carried by said stud, driven members, tension driving spring means connected to said stud and rotatable therewith, said driving spring means being adapted to engage said driven members when the load on said driving spring means is below a predeterminable limit and being adapted to yield and to become disengaged from said driven members when the load exceeds the predeterminable limit, driving means connected to said driven members, a driven block, connecting means engaging said driving means and said driven block, means for disengaging said driving spring means and said driven members from each other when said driving spring means yield, and means for disengaging the connecting means between said driving means and said driven block when said driving spring means yield.

7. A tool holding chuck including a rotatable driving member comprising a stud, a casing carried by said stud, driven members, tension driving spring means connected to said stud and rotatable therewith, said driving spring means being adapted to engage said driven members when the load on said driving spring means is below a predeterminable limit and being adapted to yield and to be disengaged from said driven members when the load exceeds the predeterminable limit, driving means connected to said driven members, a driven block, detachable connecting means engaging said driving means and said driven block, and means for disengaging said driving springs and said driven members from each other and also disconnecting said connecting means when said driving spring means yield.

8. A coupling mechanism including a rotatable driving member comprising a stud, a casing carried by said stud, adjustable tension driving spring means connected to said stud and rotatable therewith, a driving block, means for connecting said driving spring means and said driving block, means for disengaging said driving spring means and said driving block when the load on said driving spring means exceeds a predeterminable limit, a driven means, connecting means driven by said driving block and in turn driving said driven means, means associated with said connecting means adapted to disengage said driving block and said driven means, and means controlled by the driving spring means to disconnect said connecting means on disengagement of the driving spring means.

WALTER HRYBINYK.

REFERENCES CITED

The following references are of record in the file of this patent:

UNITED STATES PATENTS

| Number | Name | Date |
|---|---|---|
| 1,494,056 | Benko | May 13, 1924 |
| 1,701,423 | Sauveur | Feb. 5, 1929 |
| 1,915,542 | Lundin et al. | June 27, 1933 |
| 2,068,260 | Biggert, Jr. | Jan. 19, 1937 |